United States Patent
Nishimura

(10) Patent No.: US 9,441,716 B2
(45) Date of Patent: Sep. 13, 2016

(54) STEPLESS TRANSMISSION

(71) Applicant: HONDA MOTOR CO., LTD., Tokyo (JP)

(72) Inventor: Yuji Nishimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/646,237

(22) PCT Filed: Dec. 4, 2013

(86) PCT No.: PCT/JP2013/082556
§ 371 (c)(1),
(2) Date: May 20, 2015

(87) PCT Pub. No.: WO2014/103636
PCT Pub. Date: Jul. 3, 2014

(65) Prior Publication Data
US 2015/0292605 A1    Oct. 15, 2015

(30) Foreign Application Priority Data

Dec. 27, 2012  (JP) .................................. 2012-286029

(51) Int. Cl.
*F16H 29/00* (2006.01)
*F16H 29/04* (2006.01)

(52) U.S. Cl.
CPC ..................................... *F16H 29/04* (2013.01)

(58) Field of Classification Search
CPC ......... F16H 29/04; F16H 29/08; F16H 29/22
USPC .................................... 74/117, 119; 180/230
See application file for complete search history.

(56) References Cited

U.S. PATENT DOCUMENTS 1,343,254  A    6/1920   Dunn
1,945,702  A *  2/1934   Pitter ...................... F16H 29/02
                                                                74/117

(Continued)

FOREIGN PATENT DOCUMENTS

DE    WO 2009127183  A1 * 10/2009  ............... F16C 3/06
DE    10 2009 039 993 A1    4/2010

(Continued)

OTHER PUBLICATIONS

International Search Report dated Mar. 11, 2014 issued in corresponding application No. PCT/JP2013/082556.

*Primary Examiner* — William Kelleher
*Assistant Examiner* — Zakaria Elahmadi
(74) *Attorney, Agent, or Firm* — Westerman, Hattori, Daniels & Adrian, LLP

(57) ABSTRACT

In a stepless transmission 1, each lever crank mechanism 20 includes a rotational radius adjusting mechanism 4 capable of adjusting the radius of rotational motion of a cam shaft 51. The rotational radius adjusting mechanism 4 includes: a cam disc 5 that rotates in a state of being eccentric with respect to a rotational center axis P1; a rotary disc 6 rotatable in a state of being eccentric with respect to the cam disc 5; and a pinion shaft 7. A pair of cam discs 5 are provided in each rotational radius adjusting mechanism 4. Cam discs 5 of adjacent rotational radius adjusting mechanisms 4 are formed integrally with each other as an integral cam portion 5c so as to extend across the adjacent rotational radius adjusting mechanisms 4.

7 Claims, 20 Drawing Sheets

(56) References Cited

U.S. PATENT DOCUMENTS

| | | | | |
|---|---|---|---|---|
| 2,116,624 | A | * | 5/1938 | Garratt ............... F16C 3/28 74/117 |
| 2003/0221892 | A1 | * | 12/2003 | Matsumoto ............ B62M 9/04 180/230 |
| 2005/0039572 | A1 | * | 2/2005 | Friedmann ............ B60K 6/36 74/661 |
| 2012/0058858 | A1 | * | 3/2012 | Ichikawa ............ B60K 6/442 477/5 |
| 2012/0178577 | A1 | * | 7/2012 | Nishimura ............ B60K 6/48 475/170 |

FOREIGN PATENT DOCUMENTS

| | | |
|---|---|---|
| GB | 132628 A | 9/1919 |
| JP | 5-8336 Y2 | 3/1993 |
| JP | 2005-502543 A | 1/2005 |
| JP | 2011-518290 A | 6/2011 |
| JP | 2011-528776 A | 11/2011 |
| JP | 2012-51539 A | 3/2012 |
| JP | 2012-506003 A | 3/2012 |
| JP | 2012-141048 A | 7/2012 |
| JP | 2012-251618 A | 12/2012 |
| JP | 2012251618 A * | 12/2012 |

* cited by examiner

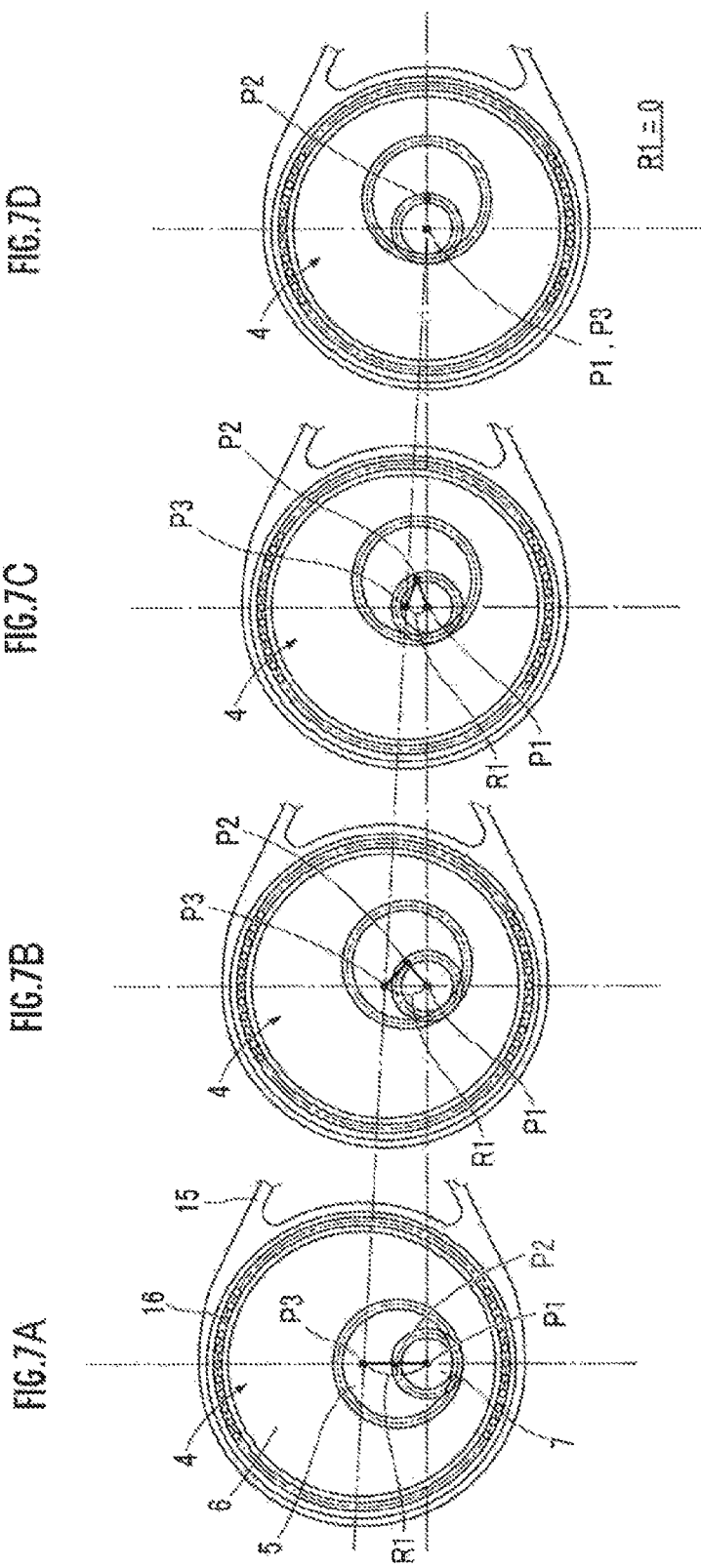

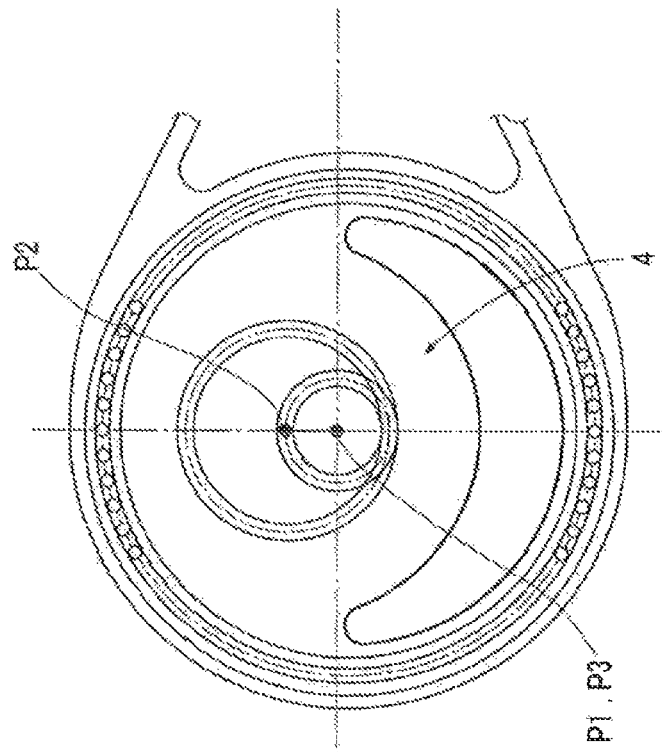
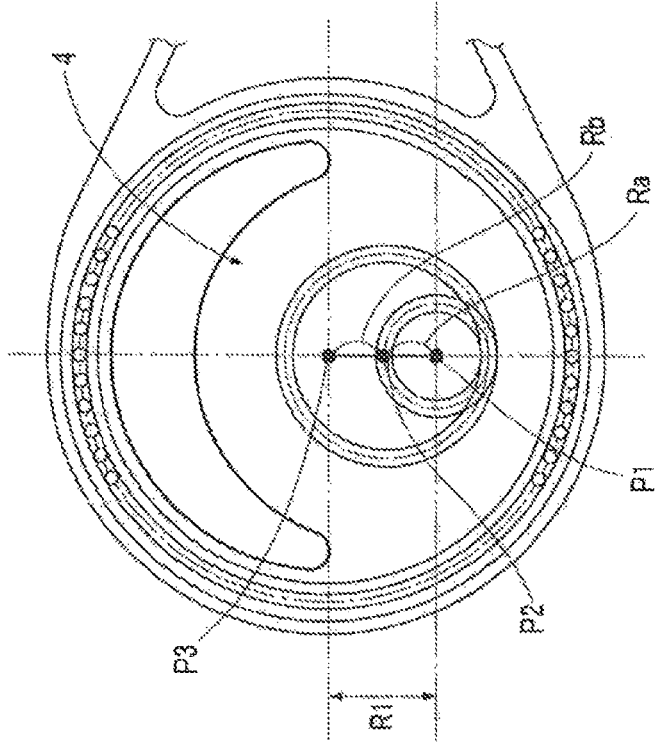

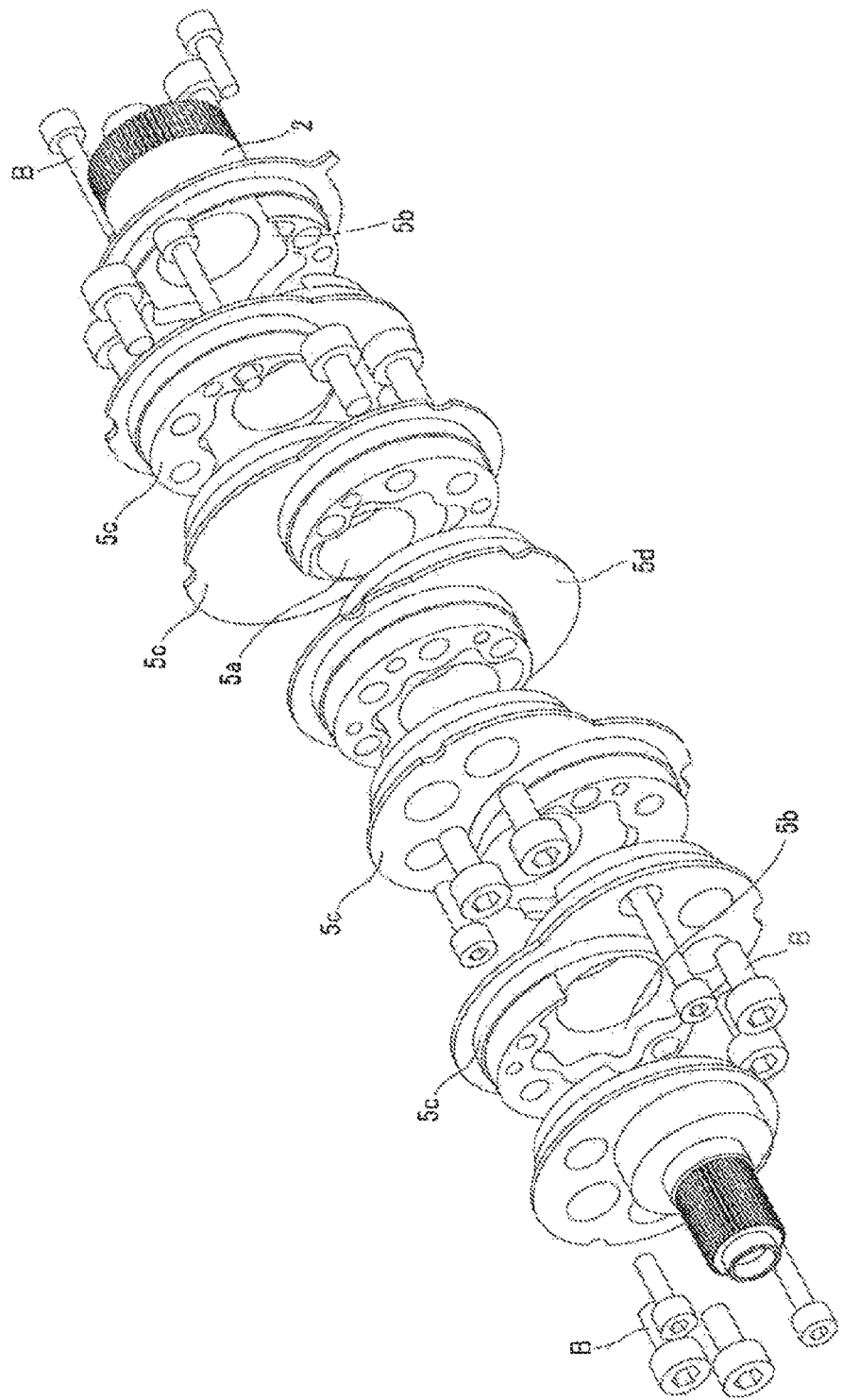

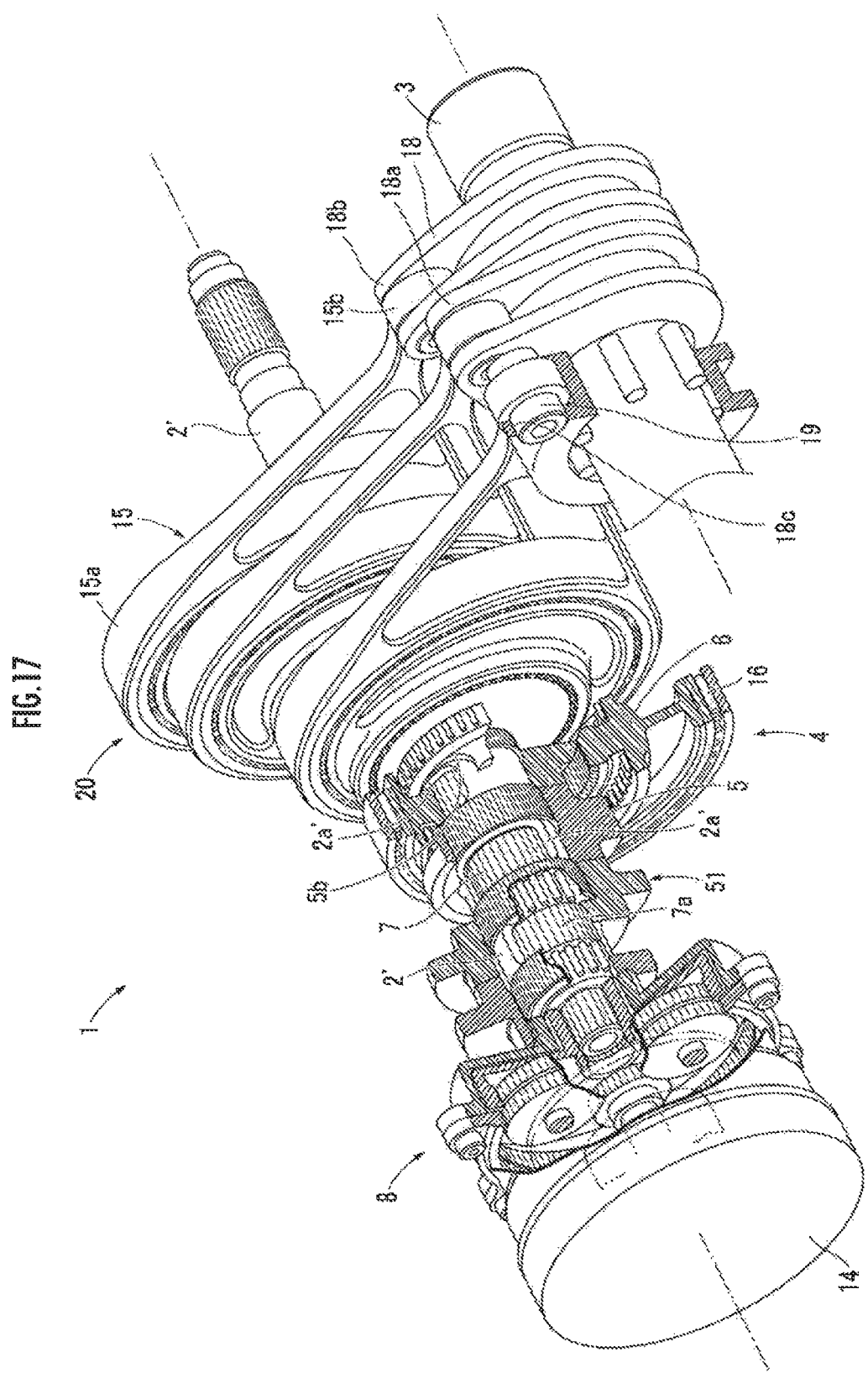

STEPLESS TRANSMISSION

TECHNICAL FIELD

The present invention relates to a four-joint link mechanism type stepless transmission using a lever crank mechanism.

BACKGROUND ART

A four-joint link mechanism type stepless transmission has been conventionally known. The four-joint link mechanism type stepless transmission includes: an input shaft to which a drive force from a drive source such as an engine provided in a vehicle is transmitted; an output shaft disposed in parallel with the input shaft; a plurality of rotational radius adjusting mechanisms provided on the input shaft; a plurality of swing links pivotally supported by the output shaft to be swingable; and connecting rods each of which has one end provided with an input-side annular section externally fitted to the corresponding rotational radius adjusting mechanism to be rotatable and the other end connected to the swing end of the corresponding swing link (for example, see Japanese Translation of PCT International Application Publication No. 2005-502543, hereinafter referred to as Patent Literature 1).

In the stepless transmission in Patent Literature 1, each rotational radius adjusting mechanism includes: a discoid cam portion eccentric with respect to the input shaft; a rotary portion eccentric with respect to the cam portion to be rotatable; and a pinion shaft. A one-way clutch is provided between the swing link and the output shaft. The one-way clutch locks the swing link to the output shaft when the swing link starts to relatively rotate to one side with respect to the output shaft, and lets the swing link idle with respect to the output shaft when the swing link starts to relatively rotate to the other side.

Each cam portion has: a through hole in the axial direction of the input shaft; and a cutout hole that is formed at a position opposite to the eccentric direction with respect to the input shaft and provides communication between the outer peripheral surface of the cam portion and the through hole. The cutout hole is formed from one end surface in the axial direction of the cam portion to the other end surface. Adjacent cam portions are fixed by bolts, thus constituting a cam portion connected body. One end of the cam portion connected body in the axial direction is connected to the input shaft, and the cam portion connected body and the input shaft constitute a cam shaft.

The cam portion connected body is hollow as the through holes of the respective cam portions are linked together, and the pinion shaft is inserted therein. The inserted pinion shaft is exposed through the cutout hole of each cam portion. The rotary portion has a receiving hole for receiving the cam shaft. Internal teeth are formed on the inner peripheral surface of the rotary portion defining the receiving hole.

The internal teeth mesh with the pinion shaft exposed through the cutout hole of the cam shaft. Rotating the input shaft and the pinion shaft at the same speed maintains the radius of the rotational motion of the input shaft by the rotational radius adjusting mechanism. Setting the input shaft and the pinion shaft at different rotational speeds from each other changes the radius of the rotational motion of the input shaft by the rotational radius adjusting mechanism, thus changing the transmission gear ratio.

Rotating the input shaft so as to rotate the rotational radius adjusting mechanism causes the input-side annular section of the connecting rod to carry out rotational motion, as a result of which the swing end of the swing link connected to the other end of the connecting rod swings. In other words, the rotational radius adjusting mechanism, the connecting rod, and the swing link constitute a lever crank mechanism. The swing link is provided around the output shaft via the one-way clutch, so that the swing link transmits a rotational drive force (torque) to the output shaft only when rotating to one side.

The eccentric directions of the cam portions of the respective rotational radius adjusting mechanisms are set so that the cam portions have different phases to form a circle around the input shaft. The connecting rods externally fitted to the respective rotational radius adjusting mechanisms cause the swing links to transmit torques to the output shaft in order, enabling smooth rotation of the output shaft.

CITATION LIST

Patent Literature

Patent Literature 1: Japanese Translation of PCT International Application Publication No. 2005-502543

SUMMARY OF INVENTION

Technical Problem

In the conventional four-joint link mechanism type stepless transmission, cam portions of adjacent rotational radius adjusting mechanisms are fixed by a bolt (or bolts). In the case where the area in which the cam portions overlap each other is small, however, the cam portions cannot be fixed by the bolt or, if the cam portions are fixed by a small-diameter bolt, the necessary connection strength between the cam portions cannot be attained. There is thus a problem of a low degree of freedom of setting the phases of adjacent cam portions.

This problem may be avoided by integrally forming all cam portions, dividing each rotary portion in the radial direction, and connecting the divided rotary portion by a bolt so as to sandwich the cam portion. However, since the internal teeth are formed on the inner peripheral surface of the rotary portion, dividing the rotary portion in the radial direction causes a decrease in accuracy of the internal teeth.

In view of the above, the present invention has an object of providing a stepless transmission in which the degree of freedom of setting the phases of adjacent cam portions is improved without a decrease in accuracy of internal teeth.

Solution to Problem

[1] To achieve the object stated above, the present invention is a stepless transmission including: an input portion to which a drive force from a travel drive source is transmitted; an output shaft disposed in parallel with a rotational center axis of the input portion; a plurality of lever crank mechanisms that each include a swing link pivotally supported by the output shaft to be swingable, and convert rotational motion of the input portion into swing motion of the swing link; and a one-way rotation blocking mechanism that locks the swing link to the output shaft when the swing link starts to relatively rotate to one side with respect to the output shaft, and lets the swing link idle with respect to the output shaft when the swing link starts to relatively rotate to the other side with respect to the output shaft, wherein the lever crank mechanisms each include: an adjustment drive source;

a rotational radius adjusting mechanism capable of adjusting a radius of the rotational motion of the input portion using a drive force of the adjustment drive source; and a connecting rod connecting the rotational radius adjusting mechanism and the swing link, wherein the rotational radius adjusting mechanism includes: a cam portion that rotates integrally with the input portion in a state of being eccentric with respect to the rotational center axis of the input portion; a rotary portion rotatable in a state of being eccentric with respect to the cam portion; and a pinion to which the drive force of the adjustment drive source is transmitted, wherein the cam portion is made up of a plurality of members, and wherein cam portions of rotational radius adjusting mechanisms adjacent in an axial direction are formed integrally with each other as an integral cam portion so as to extend across the adjacent rotational radius adjusting mechanisms.

According to the present invention, the cam portions of the rotational radius adjusting mechanisms adjacent in the axial direction are formed integrally with each other as the integral cam portion so as to extend across the adjacent rotational radius adjusting mechanisms, and the cam portion in each rotational radius adjusting mechanism is made up of the plurality of members. In other words, the adjacent cam portions between the adjacent rotational radius adjusting mechanisms are formed integrally with each other, whereas the cam portion in each individual rotational radius adjusting mechanism is made up of the plurality of members and so can be divided. Hence, the connection between cam portions can be made in each rotational radius adjusting mechanism, and need not be made between adjacent rotational radius adjusting mechanisms. The degree of freedom of setting adjacent cam portions can thus be improved without a decrease in accuracy of internal teeth.

[2] In the present invention, the integral cam portion is particularly effective in a part where an area in which the cam portions of the adjacent rotational radius adjusting mechanisms overlap each other is less than a predetermined area set based on a strength during connection by a bolt.

[3] In the present invention, the integral cam portion may have an internal thread portion and an through hole in which an external thread portion of a bolt screwed into the internal thread portion is inserted, adjacent integral cam portions may be connected to each other by the bolt screwed into the internal thread portion, and at least one of a plurality of integral cam portions may be a double-side internal thread cam portion having the internal thread portion into which the bolt is screwed from one side in the axial direction and the internal thread portion into which the bolt is screwed from the other side in the axial direction.

[4] In the present invention, the double-side internal thread cam portion may be used in a part where an area in which the cam portions of the adjacent rotational radius adjusting mechanisms overlap each other is not less than a predetermined area set based on a strength during connection by the bolt.

While the case where the overlapping area of the cam portions of the adjacent rotational radius adjusting mechanisms is less than the predetermined area in all parts poses no problem, in the case where the overlapping area is not less than the predetermined area in at least one part, the area in which the cam portions of the adjacent rotational radius adjusting mechanisms do not overlap each other is small and so there is a possibility that the placement space for the head of the bolt is insufficient or the bolt of sufficient thickness (diameter, strength) cannot be used and as a result the strength of the cam shaft decreases.

According to the present invention, in the case of including such an integral cam portion in which the overlapping area of the cam portions of the adjacent rotational radius adjusting mechanism is not less than the predetermined area and the non-overlapping area of the cam portions of the adjacent rotational radius adjusting mechanisms is small, the integral cam portion is formed as the above-mentioned double-side internal thread cam portion. This eliminates the need to place the head of the bolt in the part where the cam portions of the adjacent rotational radius adjusting mechanisms do not overlap each other. The adjacent cam portions can therefore be connected using the appropriate bolt, to prevent a decrease in strength of the cam shaft.

[5] In the present invention, the plurality of lever crank mechanisms may be six lever crank mechanisms, and phase intervals between cam portions of six rotational radius adjusting mechanisms may be set to 120°, 120°, −60°, 120°, and 120° from one side of the rotational center axis of the input portion.

[6] In the present invention, the plurality of lever crank mechanisms may be six lever crank mechanisms, and phase intervals between cam portions of six rotational radius adjusting mechanisms may be set to 180°, 60°, 180°, 60°, and 180° from one side of the rotational center axis of the input portion.

BRIEF DESCRIPTION OF DRAWINGS

FIGS. 7A to 7D are explanatory diagrams illustrating changes in rotational radius (amount of eccentricity) of a rotational radius adjusting mechanism in Embodiment 1, wherein FIG. 7A illustrates the case where the amount of eccentricity is maximum, FIG. 7B illustrates the case where the amount of eccentricity is medium, FIG. 7C illustrates the case where the amount of eccentricity is small, and FIG. 7D illustrates the case where the amount of eccentricity is 0.

FIG. 8A is an explanatory diagram illustrating an enlargement of the state in FIG. 7A, and FIG. 8B is an explanatory diagram illustrating an enlargement of the same state as in FIG. 7D.

FIG. 12 is an exploded perspective view illustrating a cam shaft in Embodiment 2.

FIG. 17 is a partial cutaway perspective view illustrating a stepless transmission in Embodiment 3.

DESCRIPTION OF EMBODIMENTS

Figure 1:
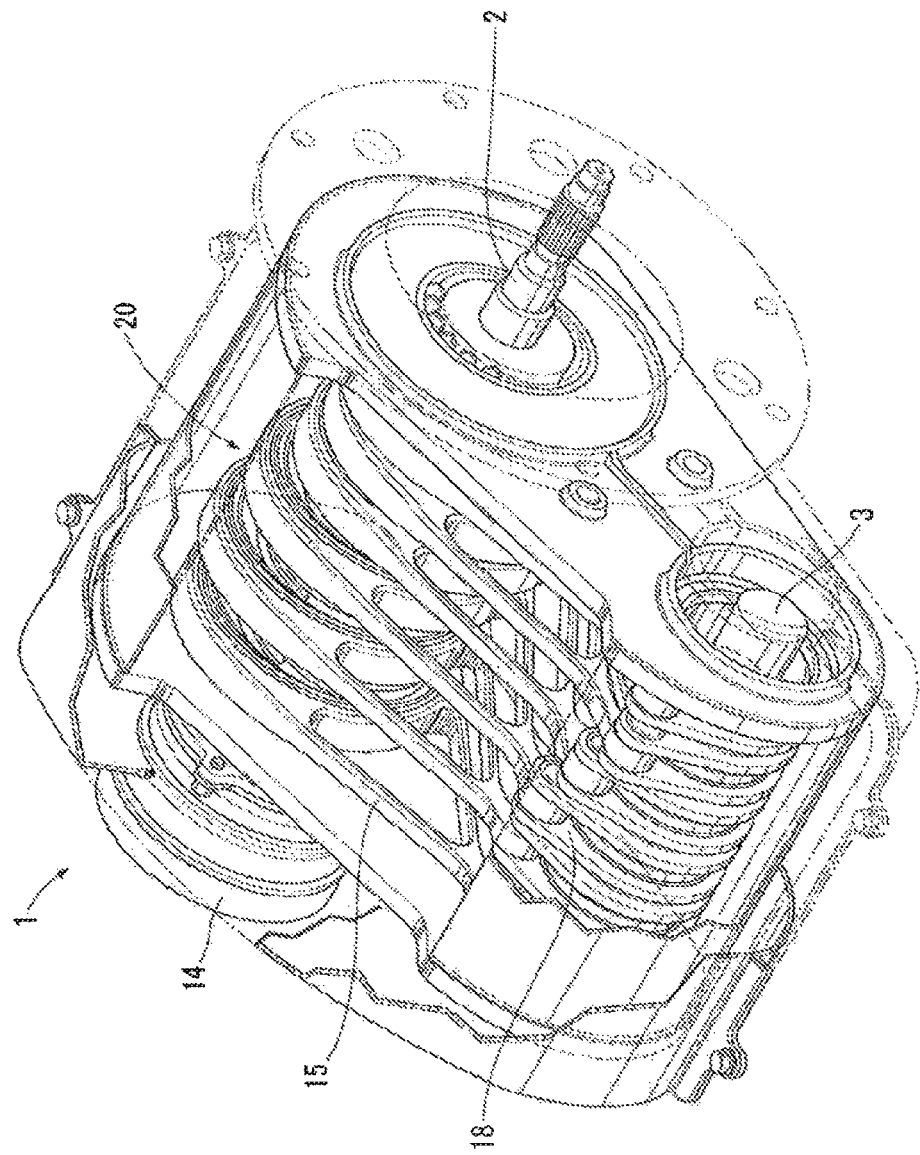
FIG. 1 is a perspective view illustrating Embodiment 1 of a stepless transmission according to the present invention.
Figure 2:
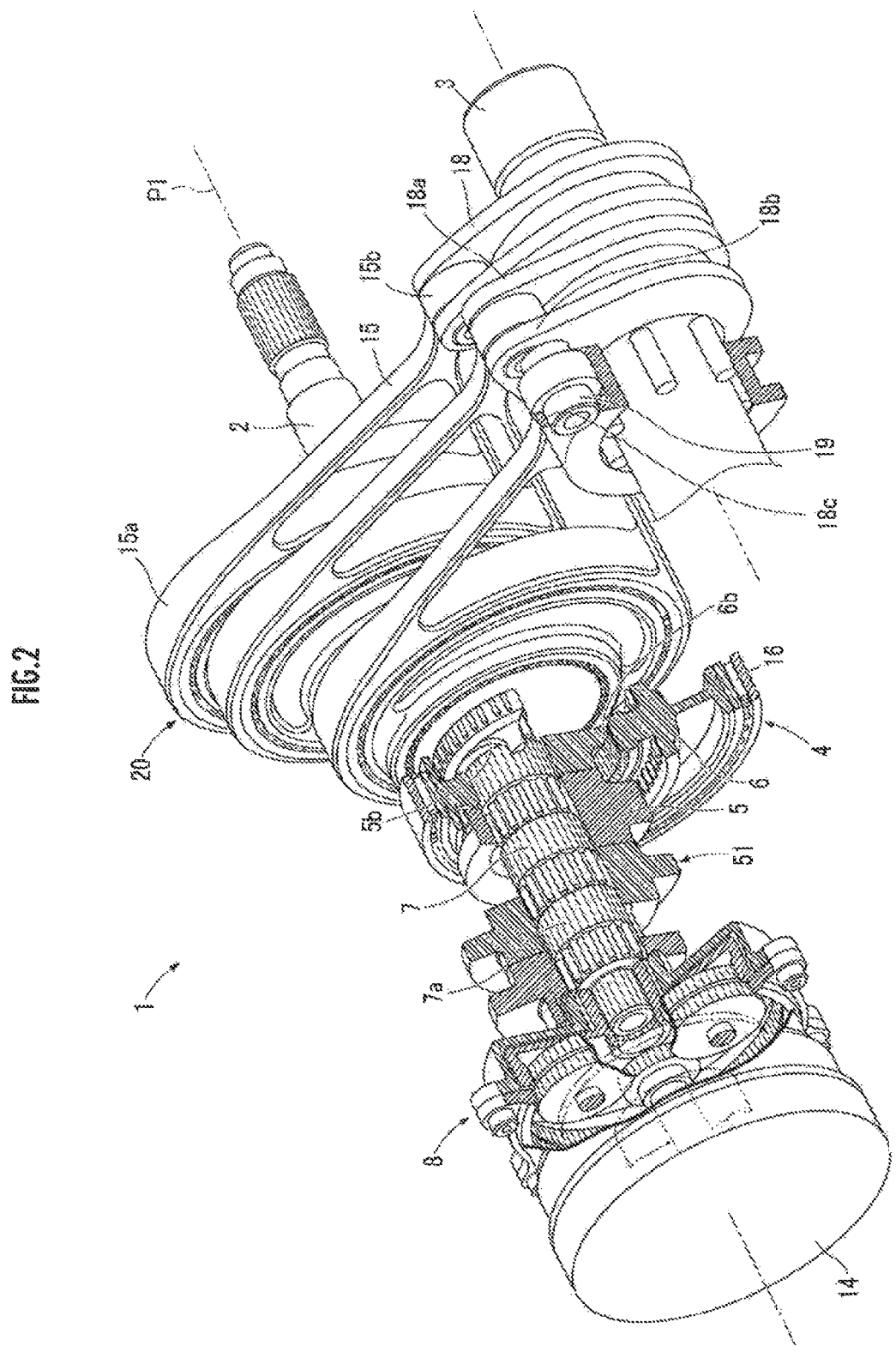
FIG. 2 is a partial cutaway perspective view illustrating the stepless transmission in Embodiment 1.
Figure 3:
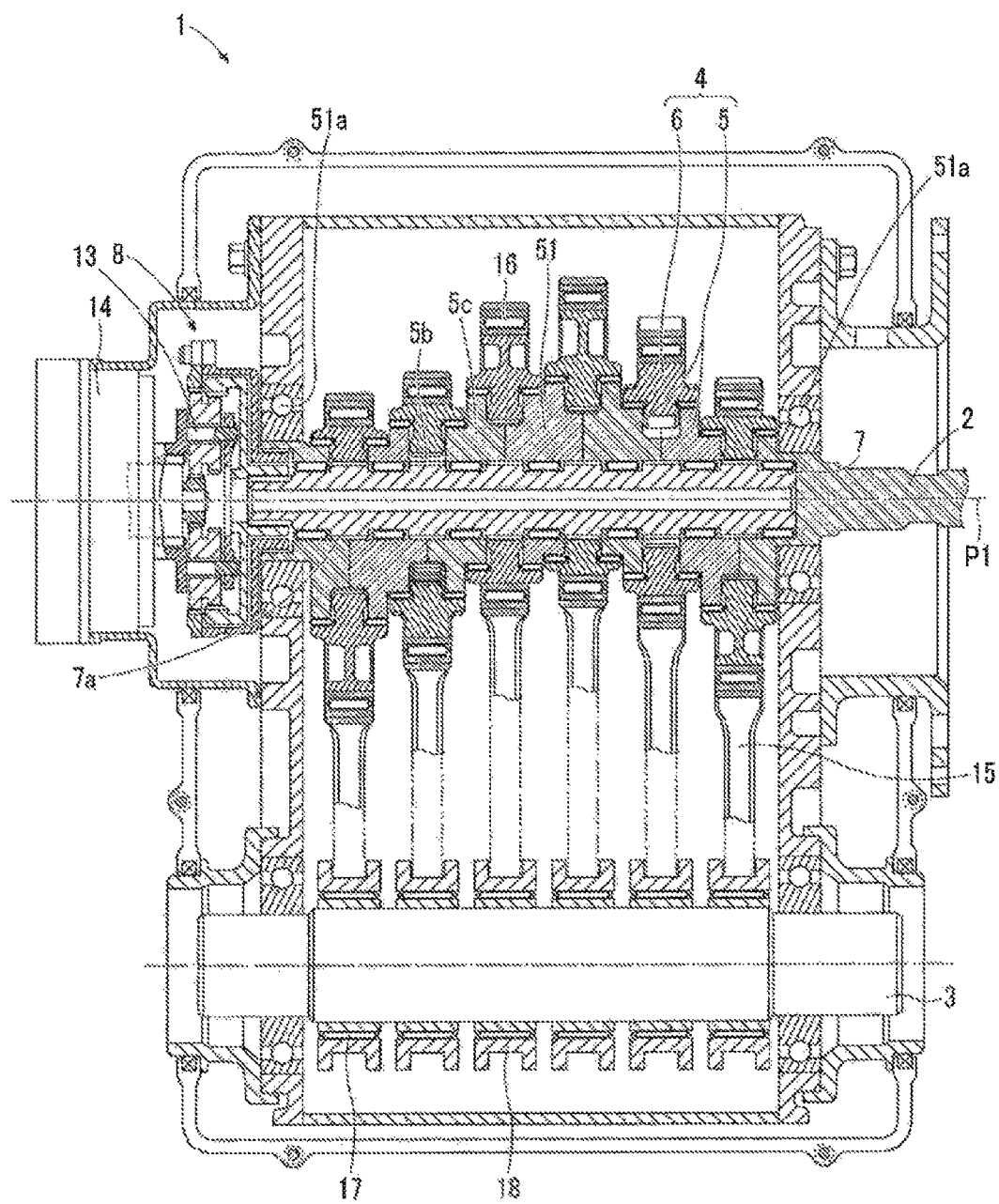
FIG. 3 is a sectional view illustrating the stepless transmission in Embodiment 1.
Figure 4:
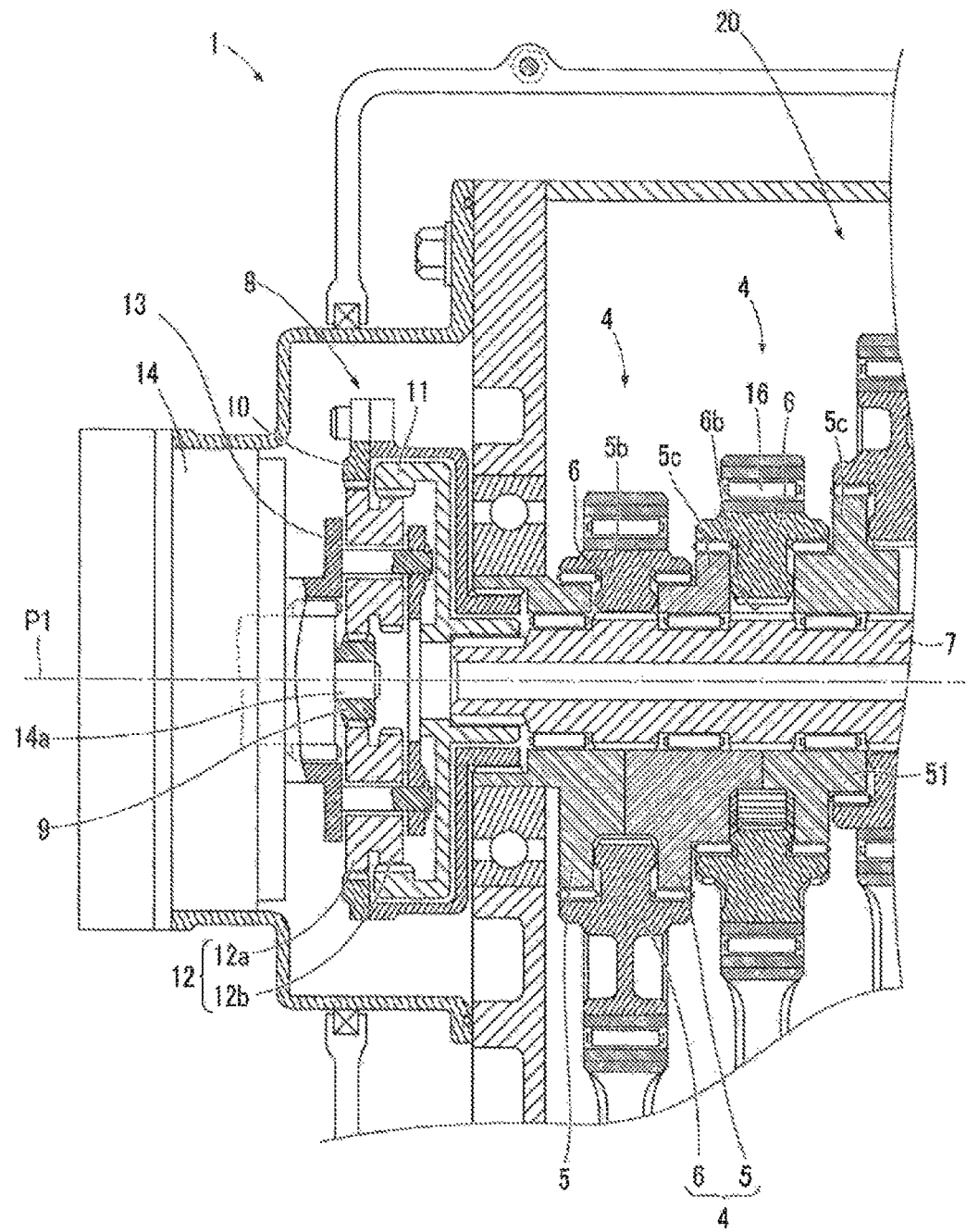
FIG. 4 is an enlarged sectional view illustrating a part in FIG. 3.

Embodiments of a four-joint link mechanism type stepless transmission according to the present invention are described below. A stepless transmission (or a continuous variable transmission (CVT)) in Embodiment 1 is an infinitely variable transmission (IVT), i.e. a type of transmission capable of setting a transmission gear ratio i (i=(the rotational speed of an input shaft)/(the rotational speed of an output shaft)) to infinity ($\infty$) so as to set the rotational speed of the output shaft to "0".

Referring to FIGS. 1 to 5, a four-joint link mechanism type stepless transmission 1 in Embodiment 1 includes: an input portion 2 that rotates about a rotational center axis P1 with a rotational drive force received from a travel drive source such as an engine (internal-combustion engine) or an electric motor; an output shaft 3 that is disposed in parallel with the rotational center axis P1 and transmits rotational motive power to the drive wheels of a vehicle through a differential gear, a propeller shaft, etc. not illustrated; and six rotational radius adjusting mechanisms 4 provided on the input portion 2.

Each rotational radius adjusting mechanism 4 includes: a cam disc 5 as a cam portion; and a rotary disc 6 as a rotary portion. The cam disc 5 has a discoid shape. The cam disc 5 is eccentric with respect to the rotational center axis P1, and is provided in each rotational radius adjusting mechanism 4 so that a pair of cam discs 5 correspond to one rotational radius adjusting mechanism 4. The cam disc 5 has a through hole 5a in the direction of the rotational center axis P1. The cam disc 5 also has a cutout hole 5b that opens in the direction opposite to the eccentric direction with respect to the rotational center axis P1 and provides communication between the outer peripheral surface of the cam disc 5 and the through hole 5a.

Figure 9A:
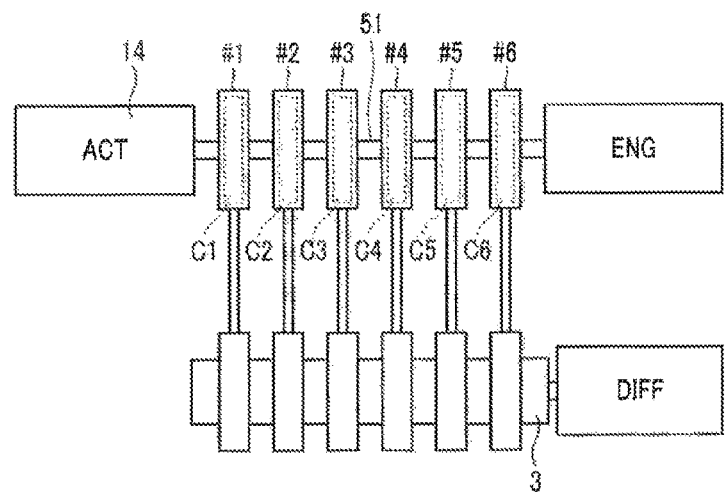
FIG. 9A is an explanatory diagram schematically illustrating the stepless transmission.
Figure 9B:
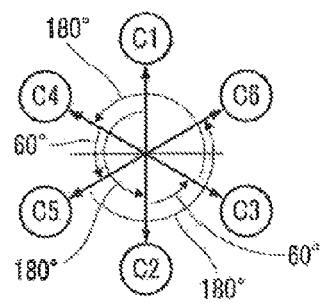
FIG. 9B is an explanatory diagram illustrating the phases of cam portions.
Figure 9C:
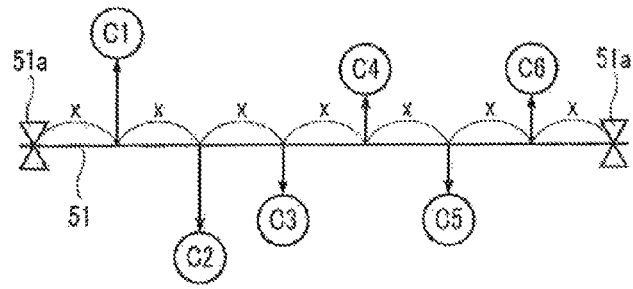
FIG. 9C is an explanatory diagram illustrating the relationship of the axial distances between the cam portions.

The individual pairs of cam discs 5 have their phases shifted by 60 degrees from each other, and disposed so that the six pairs of cam discs 5 form a circle around the input portion 2 in the circumferential direction (see FIG. 9B). The six rotational radius adjusting mechanisms 4 are defined as first to sixth rotational radius adjusting mechanisms #1 to #6 in order from the side opposite to the engine, as illustrated in FIG. 9A. The respective pairs of cam discs 5 of the first to sixth rotational radius adjusting mechanisms #1 to #6 are defined as first to sixth cam disc pairs C1 to C6 in order from the side opposite to the engine, as illustrated in FIGS. 9A to 9C.

The first cam disc pair C1 and the second cam disc pair C2 are shifted in phase from each other by 180°. The second cam disc pair C2 and the third cam disc pair C3 are shifted in phase from each other by 60°, counterclockwise in FIG. 9B. The third cam disc pair C3 and the fourth cam disc pair C4 are shifted in phase from each other by 180°. The fourth cam disc pair C4 and the fifth cam disc pair C5 are shifted in phase from each other by 60°, counterclockwise in FIG. 9B. The fifth cam disc pair C5 and the sixth cam disc pair C6 are shifted in phase from each other by 180°. The cam disc pairs C1 to C6 are arranged at predetermined regular intervals X between bearings 51a for supporting a cam shaft 51 at its ends. By arranging the cam discs 5 in this way, the centrifugal forces generated in the cam discs 5 cancel each other out, and the vibrations associated with the rotation of the cam shaft 51 are suppressed.

Each cam disc 5 is formed integrally with the cam disc 5 in the adjacent rotational radius adjusting mechanism 4, constituting an integral cam portion 5c. The integral cam portion 5c may be formed by integral molding, or formed by welding two cam portions together. The pair of cam discs 5 constituting each of the first to sixth cam disc pairs C1 to C6 are fixed to each other by one or more bolts B (see FIG. 10). The cam shaft 51 is formed in this way.

The through holes 5a of the cam discs 5 are linked together. As a result, the cam shaft 51 is hollow with one end, which is opposite to the engine, open. The cam disc 5 at the other end closest to the engine is formed integrally with the input portion 2. The cam disc 5 at the end closest to the engine is thus formed integrally with the input portion 2. The cam disc 5 and the input portion 2 may be integrally formed by integral molding, or by welding them together.

Figure 6B:
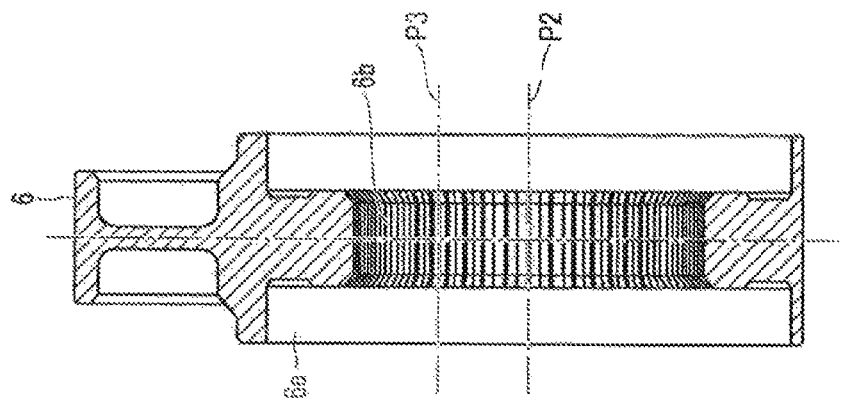
FIG. 6B is a sectional view taken along line B-B in FIG. 6A.
Figure 6A:
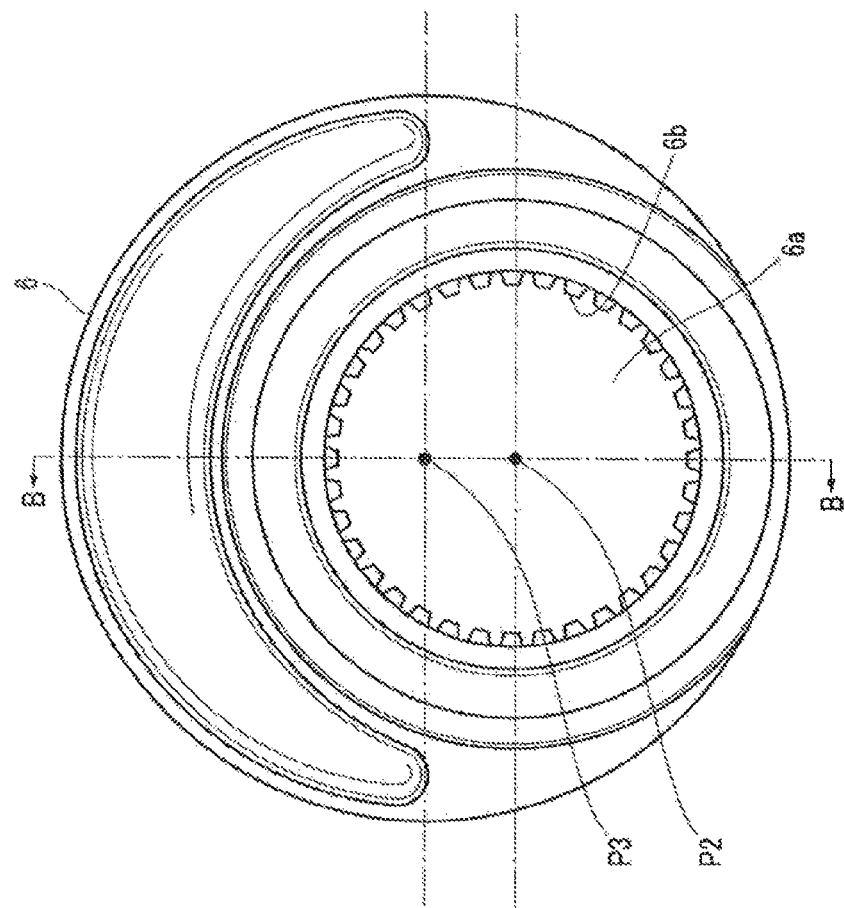
FIG. 6A is an explanatory diagram illustrating a rotary portion in Embodiment 1 from the axial direction.

The discoid rotary disc 6 is externally fitted to the pair of cam discs 5 in an eccentric state to be rotatable. The rotary disc 6 has a receiving hole 6a (see FIGS. 6A and 6B) for receiving each cam disc 5.

Figure 5:
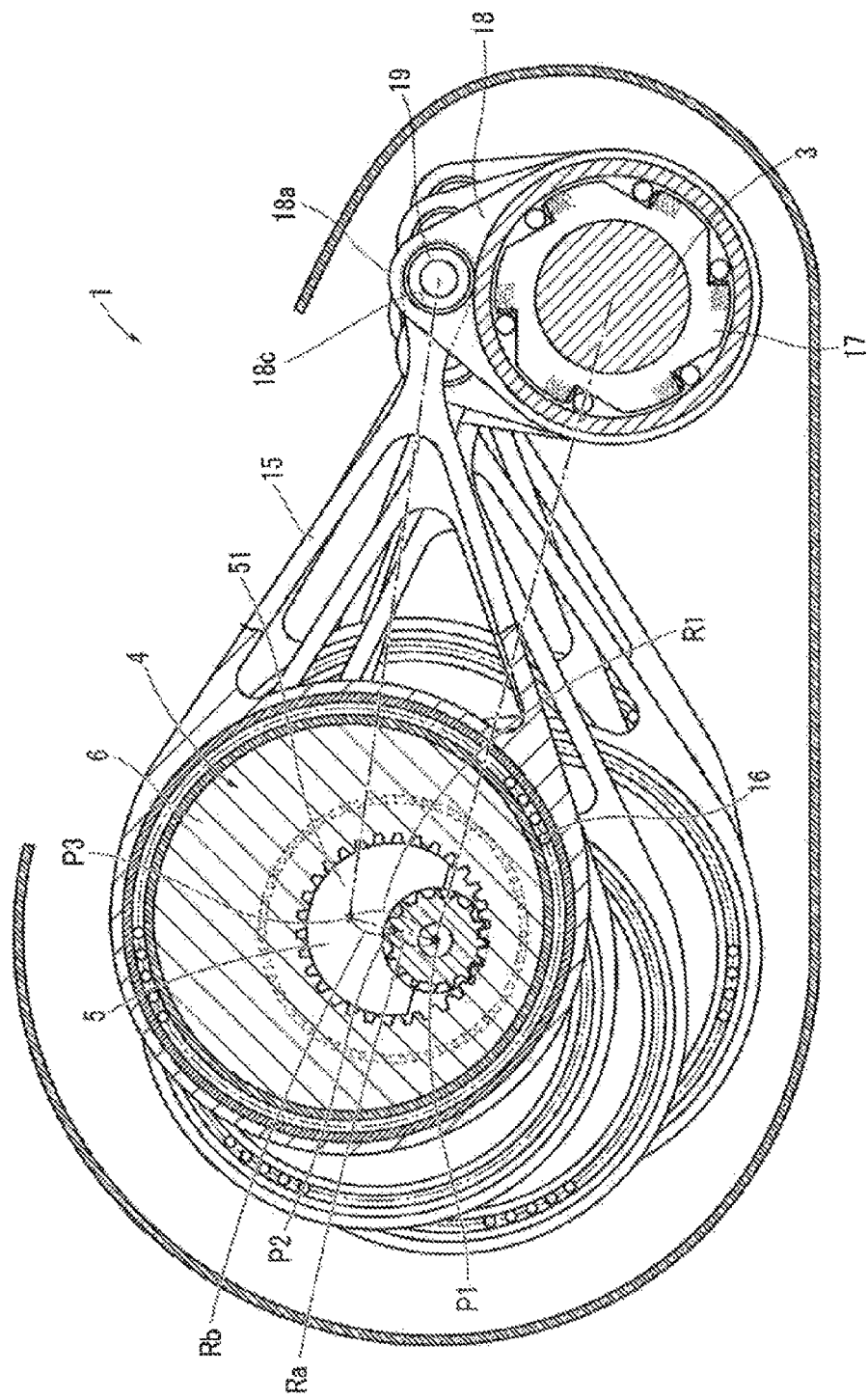
FIG. 5 is a sectional view illustrating the stepless transmission in Embodiment 1 from the axial direction.

As illustrated in FIG. 5, when the center point of the cam disc 5 is denoted by P2 and the center point of the rotary disc 6 is denoted by P3, the rotary disc 6 is eccentric with respect to the cam disc 5 so that a distance Ra between the rotational center axis P1 and the center point P2 and a distance Rb between the center point P2 and the center point P3 are the same.

The receiving hole 6a of the rotary disc 6 is provided with internal teeth 6b positioned between the pair of cam discs 5.

In the cam shaft 51, a pinion shaft 7 concentric with the rotational center axis P1 and having external teeth 7a at the location corresponding to the internal teeth 6b of each rotary disc 6 is disposed to be rotatable relative to the cam shaft 51. The external teeth 7a of the pinion shaft 7 mesh with the internal teeth 6b of the rotary disc 6 through the cutout hole 5b of the cam disc 5. The pinion shaft 7 in Embodiment 1 corresponds to a pinion in the present invention.

The pinion shaft 7 is connected with a differential mechanism 8. The differential mechanism 8 is composed of a planetary gear mechanism, and includes: a sun gear 9; a first ring gear 10 connected to the cam shaft 51; a second ring gear 11 connected to the pinion shaft 7; and a carrier 13 that pivotally supports, in a rotatable and revolvable manner, a stepped pinion 12 composed of a large-diameter section 12a that meshes with the sun gear 9 and the first ring gear 10 and a small-diameter section 12b that meshes with the second ring gear 11.

The sun gear 9 is connected to a rotating shaft 14a of an adjustment drive source 14 composed of an electric motor for the pinion shaft 7. In the case where the rotational speed of the adjustment drive source 14 and the rotational speed of the input portion 2 are the same, the sun gear 9 and the first ring gear 10 rotate at the same speed. As a result, the four elements, namely, the sun gear 9, the first ring gear 10, the second ring gear 11, and the carrier 13, are put in a locked state in which relative rotation is disabled, and the pinion shaft 7 connected to the second ring gear 11 rotates at the same speed as the input portion 2.

In the case where the rotational speed of the adjustment drive source 14 is lower than the rotational speed of the input portion 2, the number of rotations of the carrier 13 is $(j \cdot NR1+Ns)/(j+1)$, where Ns denotes the number of rotations of the sun gear 9, NR1 denotes the number of rotations of the first ring gear 10, and j denotes the gear ratio of the sun gear 9 and the first ring gear 10 ((the number of teeth of the first ring gear 10)/(the number of teeth of the sun gear 9)). Further, the number of rotations of the second ring gear 11 is $\{j(k+1)NR1+(k-j)Ns\}/\{k(j+1)\}$, where k denotes the gear ratio of the sun gear 9 and the second ring gear 11 ((the number of teeth of the second ring gear 11)/(the number of teeth of the sun gear 9)×(the number of teeth of the large-diameter section 12a of the stepped pinion 12)/(the number of teeth of the small-diameter section 12b of the stepped pinion 12)).

In the case where the rotational speed of the input portion 2 connected to the cam shaft 51 and the rotational speed of the pinion shaft 7 are the same, the rotary disc 6 rotates integrally with the cam disc 5. In the case where the rotational speed of the input portion 2 and the rotational speed of the pinion shaft 7 are different, the rotary disc 6 rotates around the peripheral edges of the cam disc 5 about the center point P2 of the cam disc 5.

As illustrated in FIG. 5, the rotary disc 6 is set to be eccentric with respect to the cam disc 5 so that the distance Ra and the distance Rb are the same. Hence, the center point P3 of the rotary disc 6 can be positioned on the same axis as the rotational center axis P1 to set the distance between the rotational center axis P1 and the center point P3, i.e. the amount of eccentricity R1, to 0.

A large-diameter annular section 15a of a connecting rod 15 is externally fitted to the peripheral edges of the rotary disc 6 to be rotatable, via a connecting rod bearing 16 made up of roller bearings. The connecting rod 15 has the large-diameter annular section 15a having a large diameter at one end, and a small-diameter annular section 15b smaller in diameter than the large-diameter annular section 15a at the other end. The connecting rod bearing 16 may be made up of each pair of ball bearings arranged in the axial direction. The output shaft 3 is provided with six swing links 18 corresponding to the connecting rods 15, each via a one-way clutch 17 as a one-way rotation blocking mechanism.

The one-way clutch 17 as the one-way rotation blocking mechanism is provided between each swing link 18 and the output shaft 3, to lock the swing link 18 to the output shaft 3 when the swing link 18 starts to relatively rotate to one side with respect to the output shaft 3 and let the swing link 18 idle with respect to the output shaft 3 when the swing link 18 starts to relatively rotate to the other side. The swing link 18 is swingable relative to the output shaft 3, when let to idle with respect to the output shaft 3 by the one-way clutch 17.

The swing link 18 is annular, and has a swing end 18a connected to the small-diameter annular section 15b of the connecting rod 15 in its upper part. The swing end 18a has a pair of protruding pieces 18b that protrude so as to sandwich the small-diameter annular section 15b in the axial direction. The pair of protruding pieces 18b have a through hole 18c that matches the inside diameter of the small-diameter annular section 15b. A connecting pin 19 is inserted into the through hole 18c and the small-diameter annular section 15b. The connecting rod 15 and the swing link 18 are connected in this way.

FIGS. 7A to 7D illustrate the positional relationship between the pinion shaft 7 and the rotary disc 6 when the amount of eccentricity R1 of the rotational radius adjusting mechanism 4 is changed. FIG. 7A illustrates the state in which the amount of eccentricity R1 is set to "maximum". The pinion shaft 7 and the rotary disc 6 are positioned so that the rotational center axis P1, the center point P2 of the cam disc 5, and the center point P3 of the rotary disc 6 are aligned. The transmission gear ratio i in this case is minimum.

FIG. 7B illustrates the state in which the amount of eccentricity R1 is set to "medium," which is smaller than that in FIG. 7A. FIG. 7C illustrates the state in which the amount of eccentricity R1 is set to "small," which is smaller than that in FIG. 7B. The transmission gear ratio i in FIG. 7B is "medium," which is larger than the transmission gear ratio i in FIG. 7A. The transmission gear ratio i in FIG. 7C is "lame," which is larger than the transmission gear ratio i in FIG. 7B. FIG. 7D illustrates the state in which the amount of eccentricity R1 is set to "0", where the rotational center axis P1 and the center point P3 of the rotary disc 6 are concentric. The transmission gear ratio i in this case is infinity ($\infty$). In the stepless transmission 1 in Embodiment 1, the radius of the rotational motion on the input portion 2 side can be adjusted by changing the amount of eccentricity R1 by the rotational radius adjusting mechanism 4.

The rotational radius adjusting mechanism 4, the connecting rod 15, and the swing link 18 constitute a lever crank mechanism 20 (a four-joint link mechanism) in Embodiment 1. The lever crank mechanism 20 converts the rotational motion of the input portion 2 into the swing motion of the swing link 18. The stepless transmission 1 in Embodiment 1 includes a total of six lever crank mechanisms 20. If the input portion 2 is rotated and the pinion shaft 7 is rotated at the same speed as the input portion 2 when the amount of eccentricity R1 is not 0, each connecting rod 15 repeatedly alternates between pushing the swing end 18a toward the output shaft 3 and pulling the swing end 18a toward the input portion 2 between the input portion 2 and the output shaft 3 based on the amount of eccentricity R1 while shifting the phase by 60 degrees, to swing the swing link 18.

The small-diameter annular section 15b of the connecting rod 15 is connected to the swing link 18 provided around the output shaft 3 via the one-way clutch 17. Hence, in the case where the swing link 18 swings by being pushed or pulled by the connecting rod 15, the output shaft 3 rotates only when the swing link 18 rotates in one of the pushing direction and the pulling direction, and the force of the swing motion of the swing link 18 is not transmitted to the output shaft 3 and the swing link 18 idles when the swing link 18 rotates in the other one of the pushing direction and the pulling direction. The rotational radius adjusting mechanisms 4 are disposed with the phase being shifted by every 60 degrees, so that the output shaft 3 is rotated in order by the rotational radius adjusting mechanisms 4.

In the stepless transmission 1 in Embodiment 1, the cam discs 5 of the rotational radius adjusting mechanisms 4 adjacent in the axial direction of the rotational center axis P1 are formed integrally with each other as the integral cam portion 5c so as to extend across the adjacent rotational radius adjusting mechanisms 4, and the cam disc 5 in each rotational radius adjusting mechanism 4 is made up of a plurality of members, that is, a cam disc pair composed of a pair of cam discs 5.

Thus, the adjacent cam discs 5 between the adjacent rotational radius adjusting mechanisms 4 are integrally formed, while the cam disc 5 in each rotational radius adjusting mechanism 4 is made up of two members and so can be divided.

Accordingly, the connection between cam discs 5 can be made in each rotational radius adjusting mechanism 4 where the overlapping area between adjacent cam discs 5 is large, while the connection between cam discs 5 need not be made between adjacent rotational radius adjusting mechanisms 4 where the overlapping area between adjacent cam discs 5 is small.

Figure 10A:
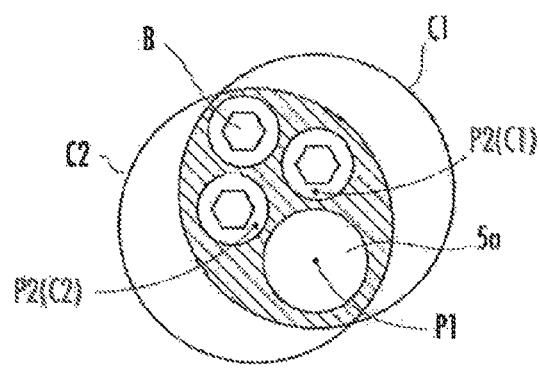
FIG. 10A is an explanatory diagram illustrating an overlapping part of cam portions when the phase difference between the adjacent cam portions is 60°.
Figure 10B:
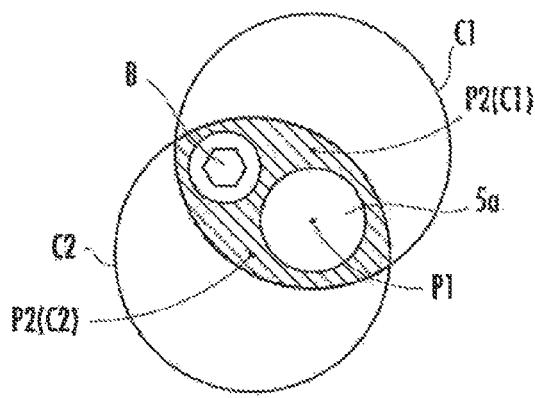
FIG. 10B is an explanatory diagram illustrating an overlapping part of cam portions when the phase difference between the adjacent cam portions is 120°.
Figure 10C:
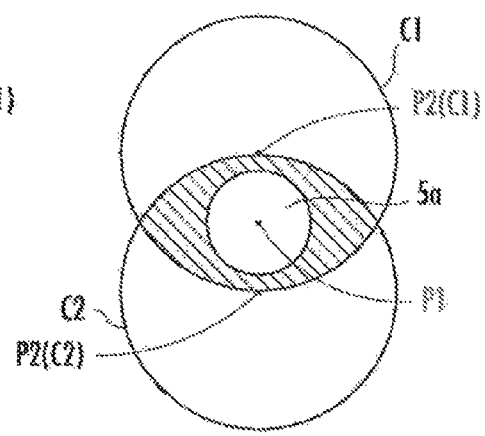
FIG. 10C is an explanatory diagram illustrating an overlapping part of the cam portions when the phase difference between the adjacent cam portions is 180°.

FIG. 10 illustrates changes in the overlapping area of the cam discs 5 between the adjacent rotational radius adjusting mechanisms 4. FIG. 10A illustrates the overlapping area in the case where the adjacent cam discs 5 are different in phase by 60°, by hatching. FIG. 10B illustrates the overlapping area in the case where the adjacent cam discs 5 are different in phase by 120°, by hatching. FIG. 10C illustrates the overlapping area in the case where the adjacent cam discs 5 are different in phase by 180°, by hatching.

As is clear from FIG. 10, while the cam discs 5 can be connected by three bolts B when the phase difference is 60° in FIG. 10A, only one bolt B of the same size can be used when the phase difference is 120° in FIG. 10B, and no bolt B of the same size can be used when the phase difference is 180° in FIG. 10C.

In the stepless transmission 1 in Embodiment 1, the decrease of the accuracy of the internal teeth 6b as in the case where the rotary disc 6 is divided in the radial direction is prevented. Moreover, in the stepless transmission 1 in Embodiment 1, the cam discs 5 between the adjacent rotational radius adjusting mechanisms 4 are formed integrally with each other as the integral cam portion Sc. This enables setting of the phase difference of 180° where the connection by the bolt B is impossible as illustrated in FIG. 10C. The degree of freedom of setting the adjacent cam discs 5 can thus be improved.

Figure 11A:
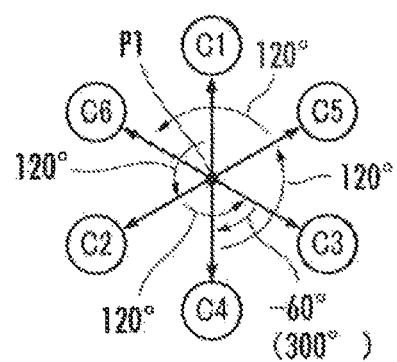
FIG. 11A is an explanatory diagram illustrating the phases of cam portions in Embodiment 2.
Figure 11B:
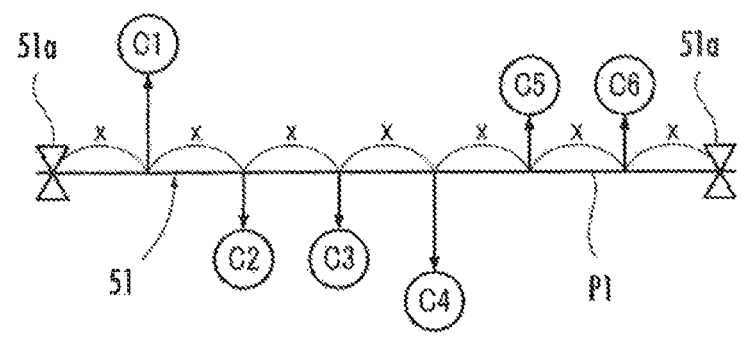
FIG. 11B is an explanatory diagram illustrating the relationship of the axial distances between the cam portions in Embodiment 2.

In Embodiment 1, the phase intervals between the adjacent cam discs 5 as cam portions are set to 180°, 60°, 180°, 60°, and 180°, in order from the adjustment drive source 14 side as one side of the rotational center axis. However, the phase intervals between the adjacent cam portions in the present invention are not limited to such. For example, the phase intervals between the adjacent cam portions may be set to 120°, 120°, −60° (300°), 120°, and 120° from one side of the rotational center axis, as in Embodiment 2 illustrated in FIG. 11. The cam shaft in Embodiment 2 equally has the advantageous effect in that the centrifugal forces generated in the cam portions cancel each other out and the vibrations associated with the rotation of the cam shaft are suppressed.

Figure 13:
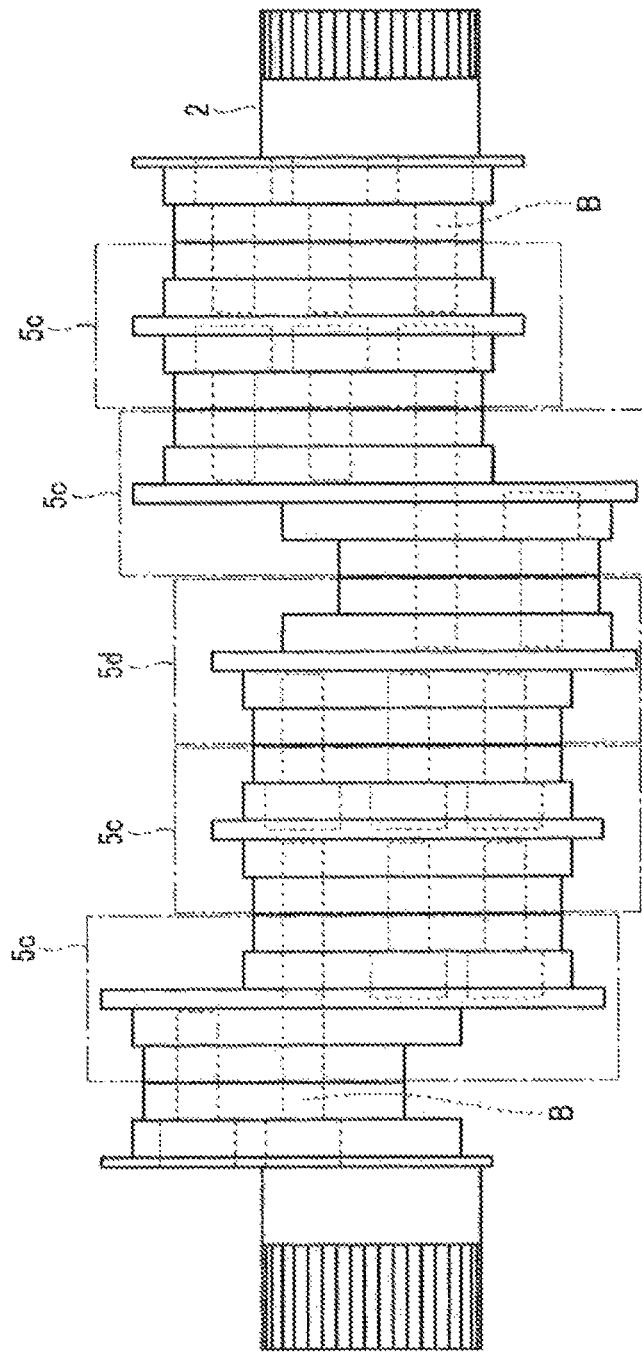
FIG. 13 is an explanatory diagram illustrating the cam shaft in Embodiment 2.
Figure 14A:
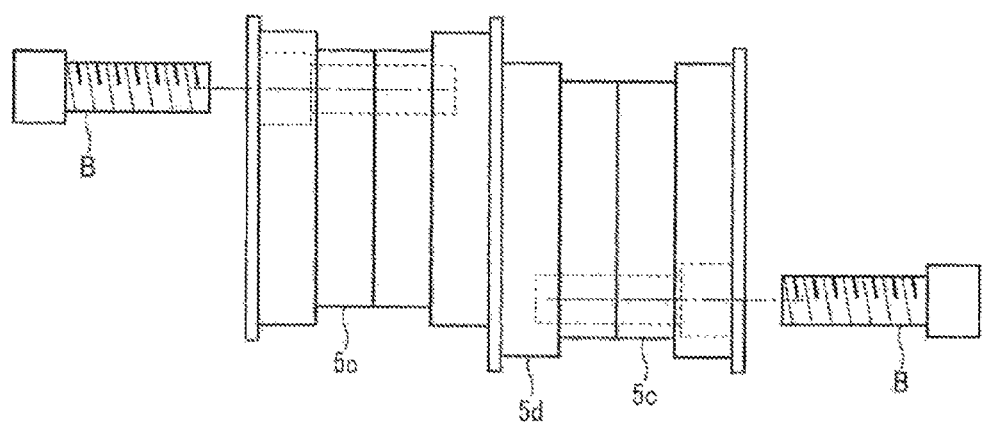
FIG. 14A is an explanatory diagram illustrating the state of connecting cam portions adjacent to a double-side internal thread cam portion by bolts in Embodiment 2.
Figure 14B:
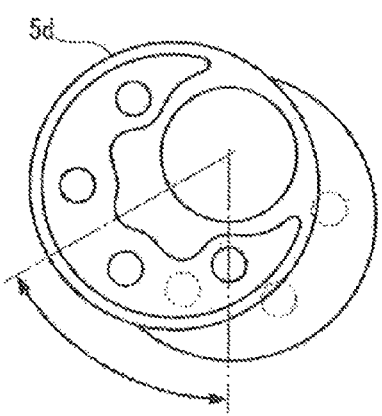
FIG. 14B is an explanatory diagram illustrating the double-side internal thread cam portion in Embodiment 2 from the axial direction.

FIG. 12 is an exploded perspective view illustrating the cam shaft 51 in Embodiment 2. FIG. 13 is an explanatory diagram illustrating the cam shaft 51 in Embodiment 2 in a side view. As illustrated in an enlarged view in FIG. 14, the cam shaft 51 in Embodiment 2 has a part where the phase difference between the cam discs 5 of adjacent rotational radius adjusting mechanisms 4 is 60°. In detail, this part is the integral cam portion between the third cam disc pair C3 and the fourth cam disc pair C4, which corresponds to a double-side internal thread cam portion in the present invention. This integral cam portion is hereafter defined as a double-side internal thread cam portion 5d.

A first internal thread portion 71 is formed in the double-side internal thread cam portion 5d from one side (engine side) in the axial direction, and a second internal thread portion 72 is formed in the double-side internal thread cam portion 5d from the other side (adjustment drive source side) in the axial direction.

The cam shaft 51 in Embodiment 2 has bolts screwed from both ends thereof toward the double-side internal thread cam portion 5d, thus connecting the adjacent integral cam portions 5c to each other.

Figure 15A:
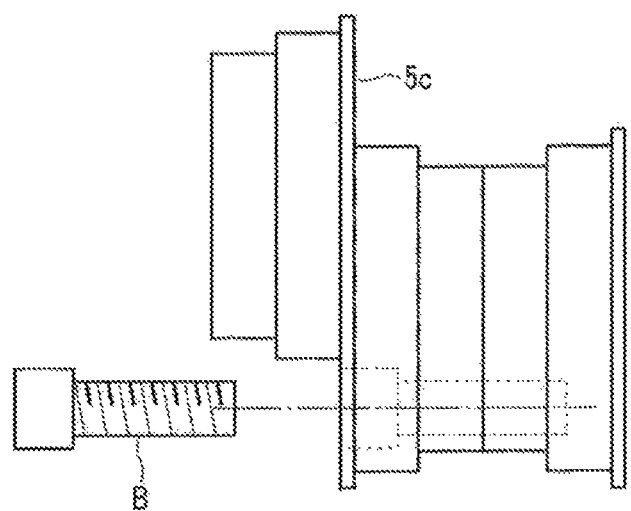
FIG. 15A is an explanatory diagram illustrating the state where the phase difference between adjacent cam portions is large.
Figure 15B:
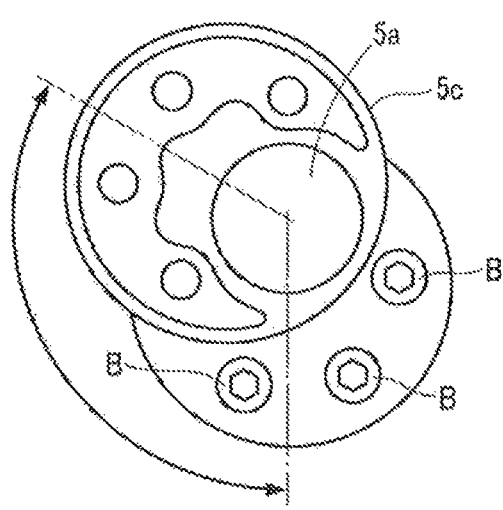
FIG. 15B is an explanatory diagram illustrating the state in FIG. 15A from the axial direction.

In the case where the cam discs 5 of the adjacent rotational radius adjusting mechanisms 4 have a large phase difference and overlap in less than a predetermined area, the area of the non-overlapping part is large and so the placement space for the head of the bolt B is sufficient, as illustrated in FIG. 15.

Figure 16A:
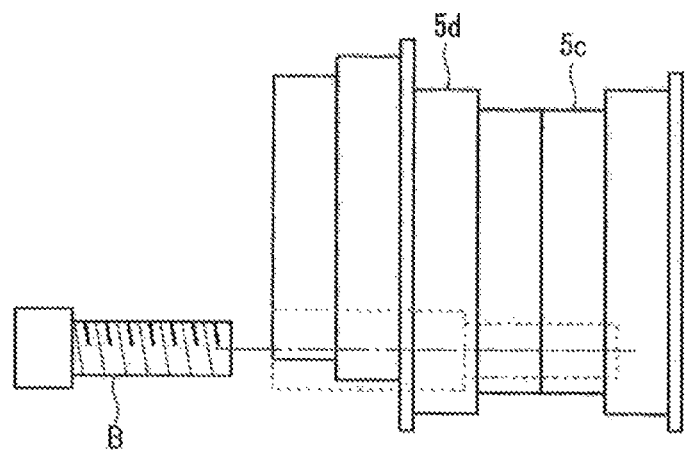
FIG. 16A is an explanatory diagram illustrating the state where the phase difference between adjacent cam portions is small.
Figure 16B:
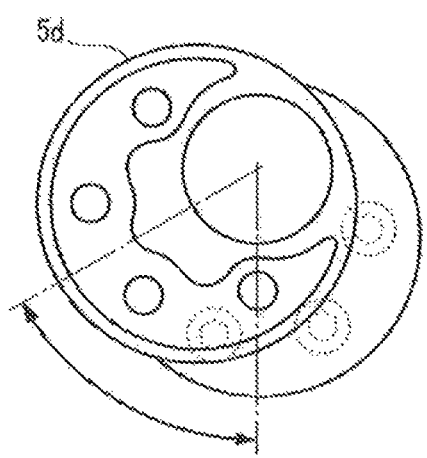
FIG. 16B is an explanatory diagram illustrating the state in FIG. 16A from the axial direction.

In the case where the cam discs 5 of the adjacent rotational radius adjusting mechanisms 4 have a small phase difference and overlap in not less than the predetermined area, however, the area of the non-overlapping part is small and so the placement space for the head of the bolt B is insufficient, as illustrated in FIG. 16.

In the stepless transmission 1 in Embodiment 2, the above-mentioned double-side internal thread cam portion 5d is provided. Even though the double-side internal thread cam portion 5d has a small phase difference and has an overlapping area not less than the predetermined area, the connection can be made using the bolts B without taking the placement space for the head of each bolt B into account. As a result, the cam shaft 51 can be formed by appropriately connecting the cam discs by the bolts B, without decreasing the rigidity of the cam shaft 51.

Figure 20:
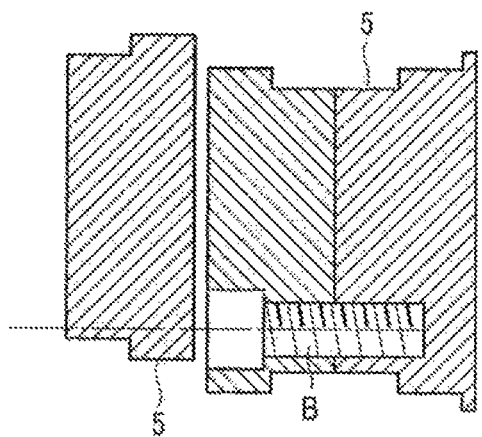
FIG. 20 is an explanatory diagram illustrating a conventional cam portion as a comparative example for comparison with the embodiments of the present invention.

FIG. 20 illustrates a structure with no integral cam portion as in the conventional cam shaft 51, as a comparative example. In the case of including no integral cam portion, each cam disc 5 is a separate body and so the problem of the placement space for the head of the bolt B does not arise, as illustrated in the drawing.

Figure 18:
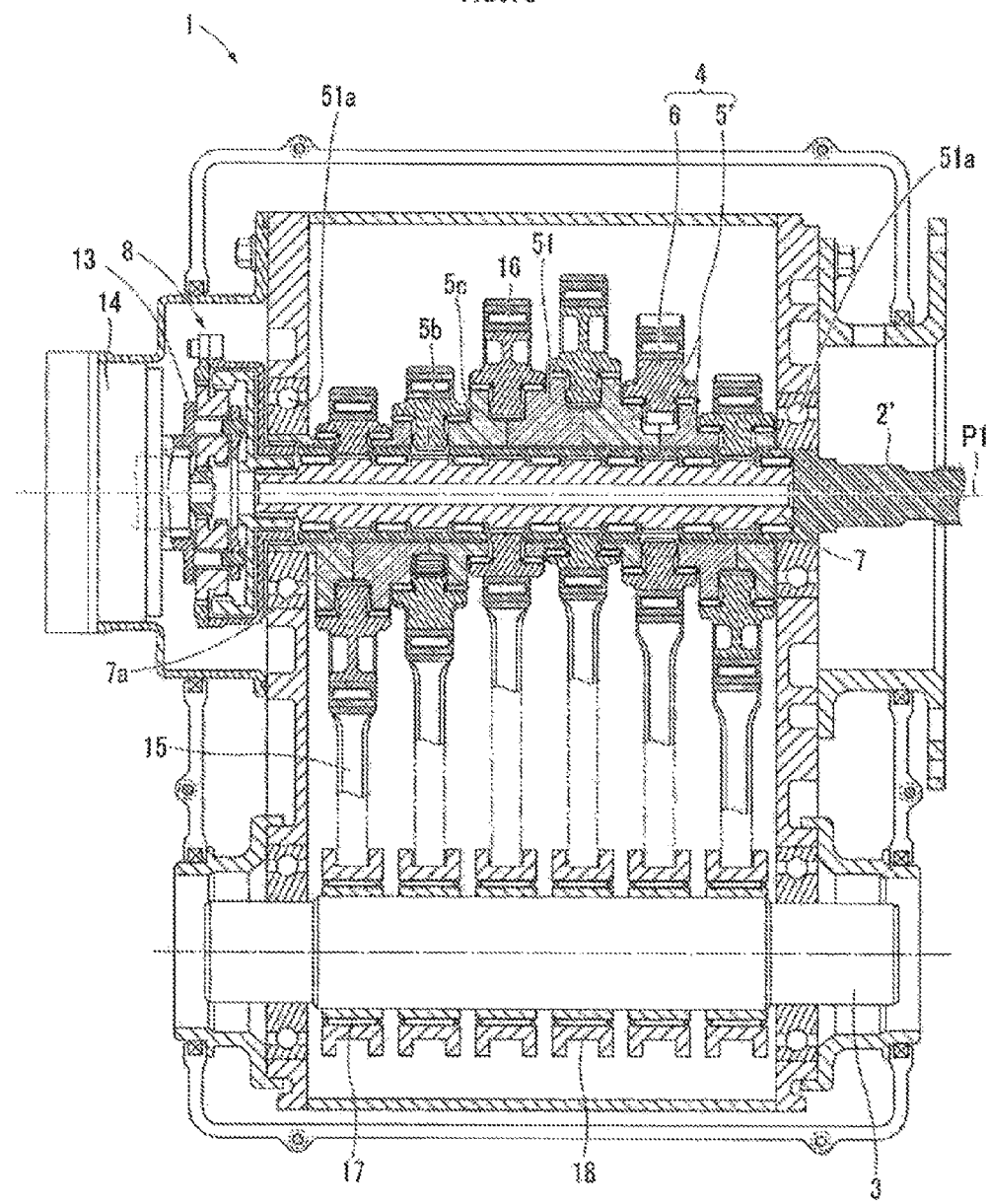
FIG. 18 is a sectional view illustrating the stepless transmission in Embodiment 3.
Figure 19:
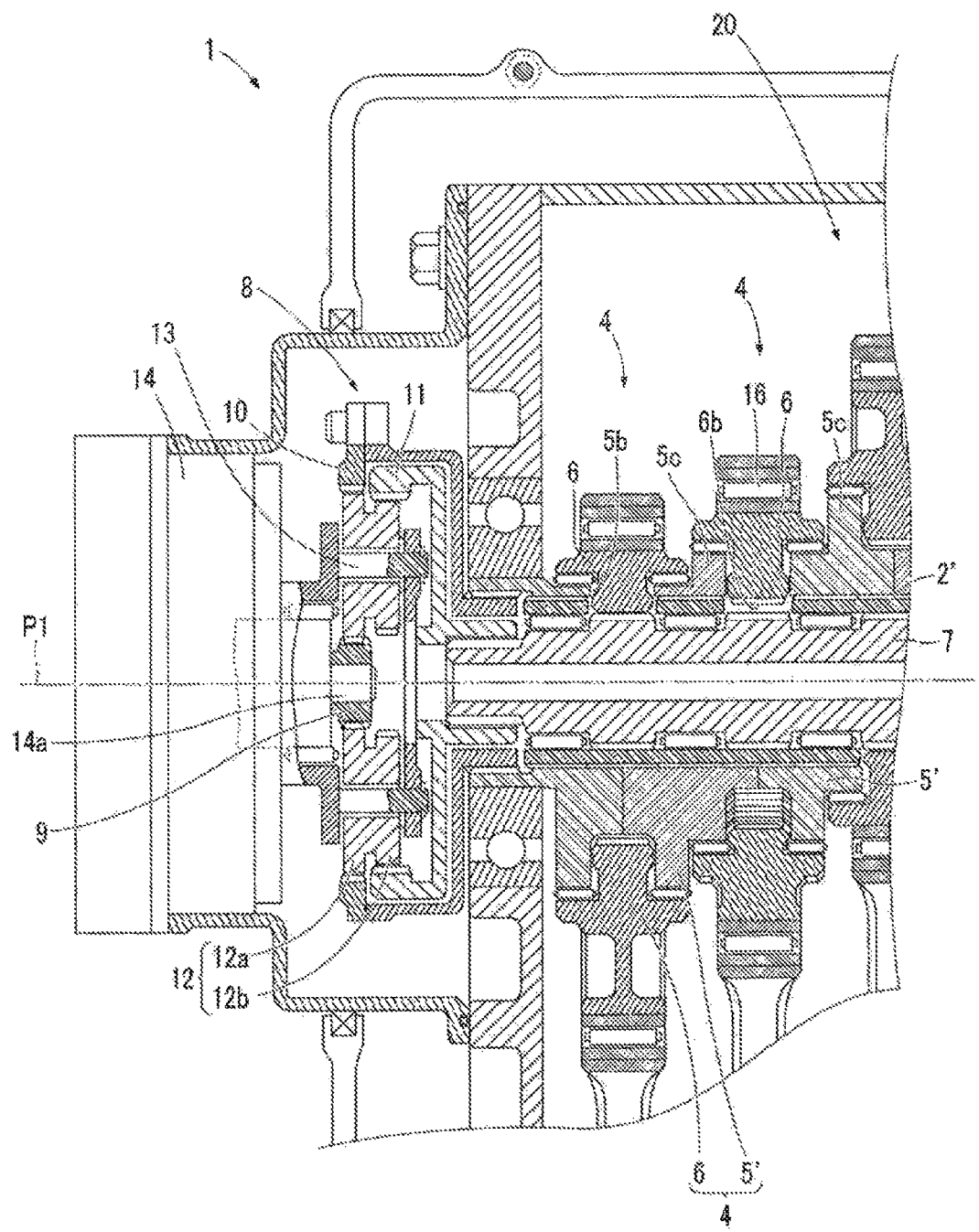
FIG. 19 is an enlarged sectional view illustrating a part in FIG. 18.

Moreover, as in Embodiment 3 illustrated in FIGS. 17 to 19, an input portion 2' may be shaped as a hollow shaft one end of which is open, where a larger through hole 5a than in Embodiment 1 is formed in each discoid cam disc 5 so that the input portion 2' can be inserted through, and each cam disc 5 is splined to the outer peripheral surface of the input portion 2' shaped as a hollow shaft.

In the stepless transmission 1 in Embodiment 3, the input portion 2' having a hollow shaft has a cutout hole 2a' corresponding to the cutout hole 5b of the cam disc 5'. The pinion shaft 7 inserted into the input portion 2' meshes with the internal teeth 6b of the rotary disc 6 via the cutout hole 2a' of the input portion 2' and the cutout hole 5b of the cam disc 5'.

In the stepless transmission 1 in Embodiments 1 to 3, the overlapping area of the cam portions of the adjacent rotational radius adjusting mechanisms when the phase difference is 60° as in FIG. 10A corresponds to "a predetermined area set based on a strength during connected by a bolt" in the present invention.

Accordingly, though Embodiment 1 describes the case where the cam discs 5 adjacent between the adjacent rotational radius adjusting mechanisms are all integrally formed as integral cam portions 5c, the stepless transmission according to the present invention is not limited to this. For example, the cam discs 5 adjacent between the second cam disc pair C2 and the third cam disc pair C3 and the cam discs 5 adjacent between the fourth cam disc pair C4 and the fifth cam disc pair C5 with the phase difference of 60° in the stepless transmission in Embodiment 1 as illustrated in FIG. 9B may be connected by bolts as illustrated in FIG. 10A, because the overlapping area of the cam discs is not less than the predetermine area but greater than or equal to the predetermined area in the case where the phase difference is 60°.

Note that the "predetermined area" in the present invention varies depending on the material, strength, size, etc. of the cam portions, and is set beforehand by determining, through experiment and the like, whether or not the strength required for the cam shaft is attained.

Although the one-way clutch 17 is used as the one-way rotation blocking mechanism in Embodiment 1, the one-way rotation blocking mechanism in the present invention is not limited to this. For example, the one-way rotation blocking mechanism may be a two-way clutch capable of switching the rotational direction of the swing link 18 with respect to the output shaft 3 that allows torque transmission from the swing link 18 to the output shaft 3.

DESCRIPTION OF REFERENCE NUMERALS 1 stepless transmission
2 input portion (Embodiment 1)
2' input portion (Embodiment 3)
2a' cutout hole (Embodiment 3)
3 output shaft
4 rotational radius adjusting mechanism
5 cam disc (cam portion in Embodiment 1)
5' cam disc (cam portion in Embodiment 3)
5a through hole
5b cutout hole
5c integral cam portion
5d double-side internal thread cam portion (Embodiment 2)
6 rotary disc (rotary portion)
6a receiving hole (inner peripheral portion)
6b internal teeth
7 pinion shaft (pinion)
7a external teeth
8 differential mechanism (planetary gear mechanism)
9 sun gear
10 first ring gear
11 second ring gear
12 stepped pinion
12a large-diameter section
12b small-diameter section
13 carrier
14 adjustment drive source (electric motor)
14a rotating shaft
15 connecting rod
15a large-diameter annular section
15b small-diameter annular section
16 connecting rod bearing
17 one-way clutch (one-way rotation blocking mechanism)
18 swing link
18a swing end
18b protruding piece
18c through hole
19 connecting pin
20 lever crank mechanism (four-joint link mechanism)
51 cam shaft
51a bearing
71 first internal thread portion
72 second internal thread portion
P1 rotational center axis
P2 center point of cam disc
P3 center point of rotary disc
Ra distance between P1 and P2
Rb distance between P2 and P3
R1 amount of eccentricity (distance between P1 and P3)
θ1 rotational angle of rotational radius adjusting mechanism
θ2 swing range
1 first rotational radius adjusting mechanism
2 second rotational radius adjusting mechanism
3 third rotational radius adjusting mechanism
4 fourth rotational radius adjusting mechanism
5 fifth rotational radius adjusting mechanism
6 sixth rotational radius adjusting mechanism
C1 first cam disc pair
C2 second cam disc pair
C3 third cam disc pair
C4 fourth cam disc pair
C5 fifth cam disc pair
C6 sixth cam disc pair

The invention claimed is:

1. A stepless transmission comprising:
an input portion to which a drive force from a travel drive source is transmitted;
an output shaft disposed in parallel with a rotational center axis of the input portion;
a plurality of lever crank mechanisms that each include a swing link pivotally supported by the output shaft to be swingable, and convert rotational motion of the input portion into swing motion of the swing link; and
a one-way rotation blocking mechanism that locks the swing link to the output shaft when the swing link starts to relatively rotate to one side with respect to the output shaft, and lets the swing link idle with respect to the output shaft when the swing link starts to relatively rotate to the other side with respect to the output shaft,
wherein the lever crank mechanisms each include: an adjustment drive source; a rotational radius adjusting mechanism capable of adjusting a radius of the rotational motion of the input portion using a drive force of the adjustment drive source; and a connecting rod connecting the rotational radius adjusting mechanism and the swing link,
wherein the rotational radius adjusting mechanism includes: a cam portion that rotates integrally with the input portion in a state of being eccentric with respect to the rotational center axis of the input portion; a rotary portion made up of one member, the rotary portion having a receiving hole for receiving the cam portion and being rotatable in a state of being eccentric with respect to the cam portion; internal teeth provided in the receiving hole; and a pinion that meshes with the internal teeth and to which the drive force of the adjustment drive source is transmitted,
wherein the cam portion is formed by connecting a plurality of members by a bolt,
wherein cam portions of rotational radius adjusting mechanisms adjacent in an axial direction are formed integrally with each other as an integral cam portion so as to extend across the adjacent rotational radius adjusting mechanisms, and wherein in the integral cam portion, an area in which the cam portions of the adjacent rotational radius adjusting mechanisms overlap each other is less than a predetermined area set based on a strength during connection by the bolt.

2. The stepless transmission according to claim 1, wherein the integral cam portion has an internal thread portion and a through hole in which an external thread portion of a bolt screwed into the internal thread portion is inserted, wherein adjacent integral cam portions are connected to each other by the bolt screwed into the internal thread portion, and wherein at least one of a plurality of integral cam portions is a double-side internal thread cam portion having the internal thread portion into which the bolt is screwed from one side in the axial direction and the internal thread portion into which the bolt is screwed from the other side in the axial direction.

3. The stepless transmission according to claim 2, wherein in the double-side internal thread cam portion, an area in which the cam portions of the adjacent rotational radius adjusting mechanisms overlap each other is not less than a predetermined area set based on a strength during connection by the bolt.

4. The stepless transmission according to claim 3, wherein the plurality of lever crank mechanisms are six lever crank mechanisms, and wherein phase intervals between cam portions of six rotational radius adjusting mechanisms are set to 120°, 120°, −60°, 120°, and 120° from one side of the rotational center axis of the input portion.

5. The stepless transmission according to claim 3, wherein the plurality of lever crank mechanisms are six lever crank mechanisms, and wherein phase intervals between cam portions of six rotational radius adjusting mechanisms are set to 180°, 60°, 180°, 60°, and 180° from one side of the rotational center axis of the input portion.

6. The stepless transmission according to claim 1, wherein the plurality of lever crank mechanisms are six lever crank mechanisms, and wherein phase intervals between cam portions of six rotational radius adjusting mechanisms are set to 120°, 120°, −60°, 120°, and 120° from one side of the rotational center axis of the input portion.

7. The stepless transmission according to claim 1, wherein the plurality of lever crank mechanisms are six lever crank mechanisms, and wherein phase intervals between cam portions of six rotational radius adjusting mechanisms are set to 180°, 60°, 180 °, 60°, and 180° from one side of the rotational center axis of the input portion.

* * * * *